Oct. 23, 1928.
A. ALEXANDER
TIRE
Filed Sept. 1, 1926
1,688,322
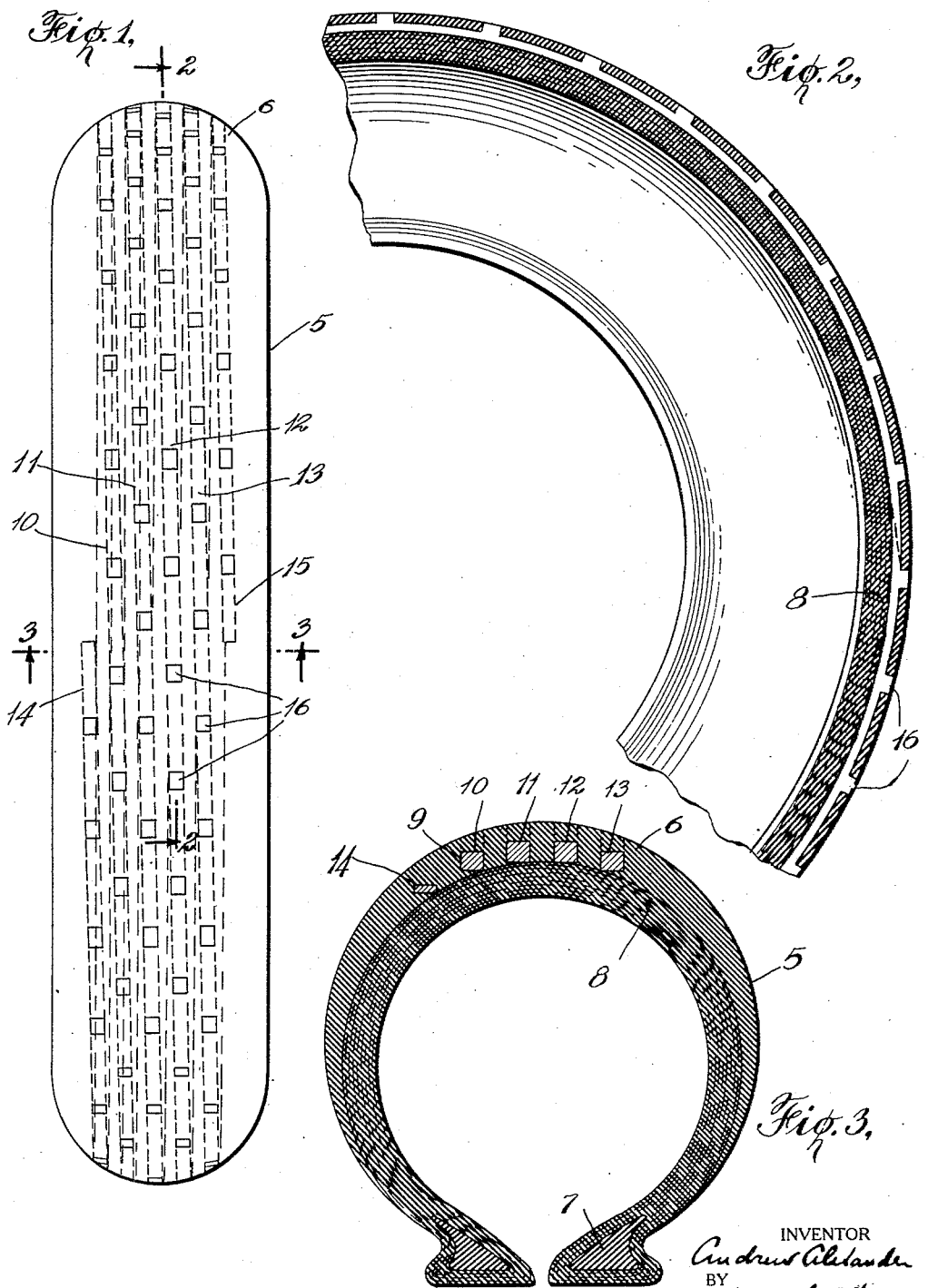
INVENTOR
Andrew Alexander
BY
Howard E. Thompson
ATTORNEY Patented Oct. 23, 1928.

1,688,322

UNITED STATES PATENT OFFICE.

ANDREW ALEXANDER, OF NEW YORK, N. Y.

TIRE.

Application filed September 1, 1926. Serial No. 132,947.

This invention relates to resilient tires, and particularly to the construction of what is known as the shoe of a tire; and the object of the invention is to provide the tread portion of a tire shoe with means for reinforcing the same consisting of a spirally arranged strip extending circumferentially of the tread portion of the shoe and imbedded therein, said strip having at spaced intervals, projecting members which are adapted to be exposed through the outer face of the tread portion of the tire to take up the wear and to give longer life and durability to the shoe; a further object being to provide the shoe of a tire with a strip of the character above referred to which will provide and compensate for the required resiliency in the shoe, the strip being movable with the body of the shoe in the resilient action thereof; and with these and other objects in view, the invention consists in a tire of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is an edge view of a tire made according to my invention.

Fig. 2 is a partial, sectional view of the tire shown in Fig. 1, the section being on the line 2—2 of Fig. 1; and, Fig. 3 is a transverse section on the line 3—3 of Fig. 1.

In the drawing, I have illustrated at 5 the shoe of a tire, which may be of any conventional form and construction, 6 represents the tread portion of the shoe, 7 the rim portion and 8 fabric or other material constituting part of the shoe structure and imbedded therein.

In practice, I provide a long strip 9 of rigid material, for example a strip of metal, which is fashioned to form a large spring-like body, the diameter of which is substantially the same as the diameter of the tread portion of the tire. Said body, in the construction shown, consists of four windings or coils designated at 10, 11, 12 and 13. The ends of said coils at 14 15 are arranged at opposite sides of the tread portion of the shoe, and the coils 10—13 are arranged centrally of the tread portion 6 of the shoe and are imbedded therein, said coils having at spaced intervals, outwardly projecting members 16 which are exposed through the outer face of the tread portion 6 of the shoe.

It will be seen that the body of rubber or other material employed in the construction of the tire, encircles the separate coils of the strip 9 except for the exposed faces of the projecting members 16, it being apparent that the coils 10—13 as well as the end portions 14 and 15 of the strip 9 are spaced transversely of the shoe, as clearly seen in Figs. 1 and 3, and said coils are spirally arranged.

The exposed faces of the projecting members 16 will serve to take up the wear of the tire and will also present a tread surface which will function as a non-skid tread, in that the projecting members of rigid material will provide a firm grip on a slippery pavement or roadway. It will also be understood that the tread face of the tire or shoe proper may be constructed in any desired manner, and while a plain tread is shown, my invention is not limited in this respect and various other changes in and modifications of the construction herein shown and described may be made within the scope of the appended claim without departing from the spirit of my invention or sacrificing its advantages.

Having fully described my invention, what I claim as new and desire to secure by Letters Patent, is:—

In a tire of the class described, a strip of rigid material imbedded in the tread portion of the tire and in spiral arrangement circumferentially thereof, the coils of said strip being in spaced relation and separated by the rubber body in said tread portion and the separate windings of said strip having integral and outwardly projecting members arranged in a circumferentially and transversely spaced relation with reference to the tread portion of the tire and with the outer faces of said members exposed through and lying flushly with the tread portion of the tire.

In testimony that I claim the foregoing as my invention I have signed my name this 26th day of August 1926.

ANDREW ALEXANDER.